Sept. 14, 1965  J. R. PARADIS ETAL  3,206,350
APPARATUS FOR APPLYING BINDING MATERIAL
Filed Oct. 26, 1962  3 Sheets-Sheet 1

Inventors
Joseph R. Paradis
Louis E. Dillenbeck

By

Attorney

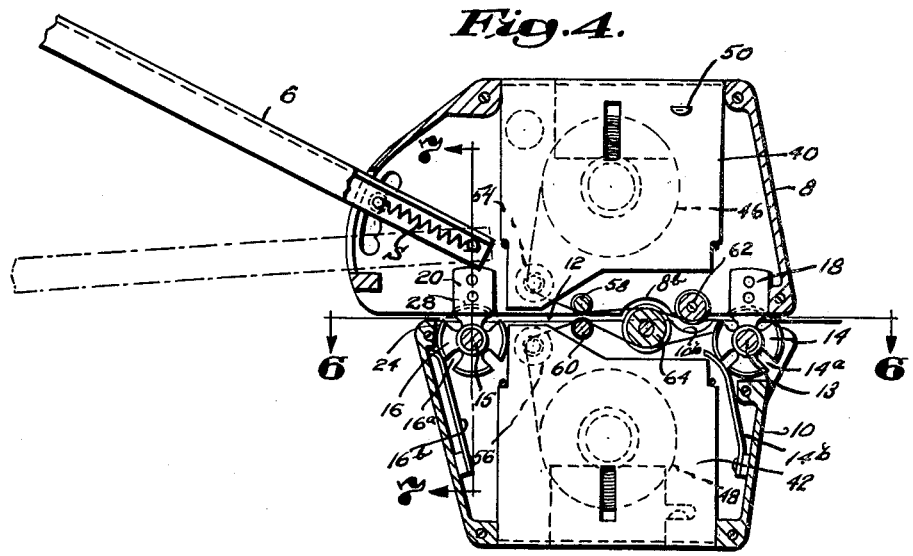

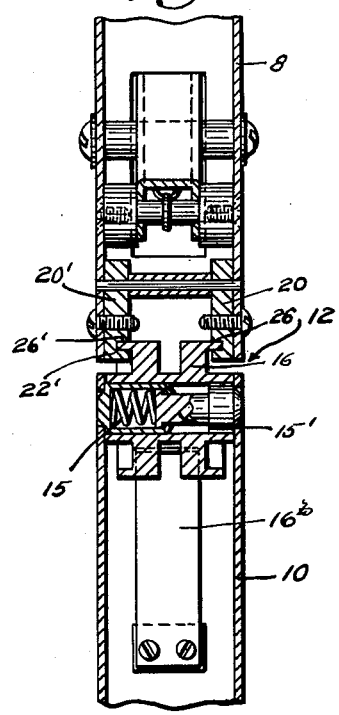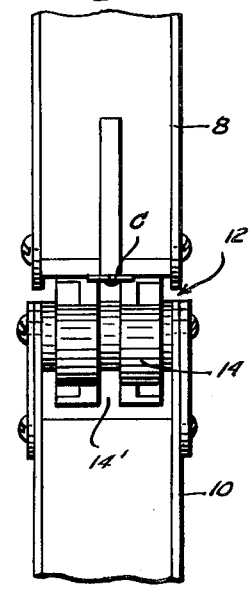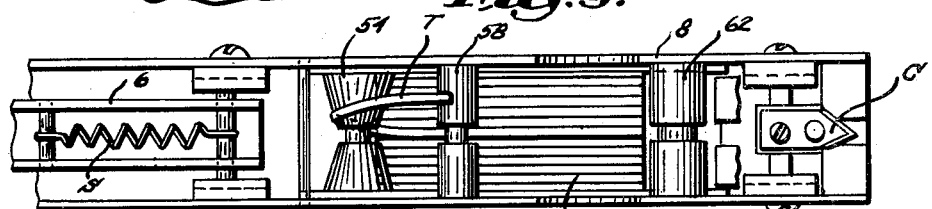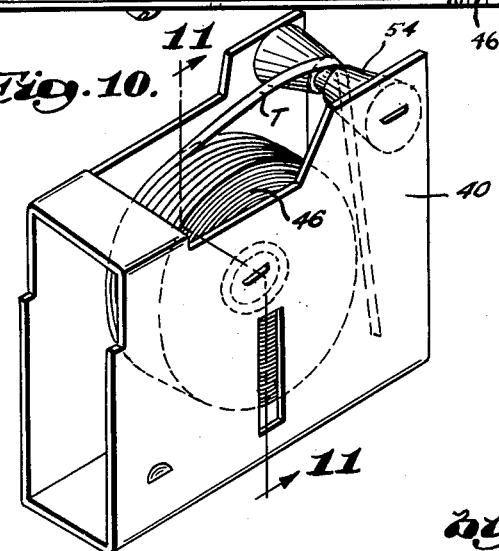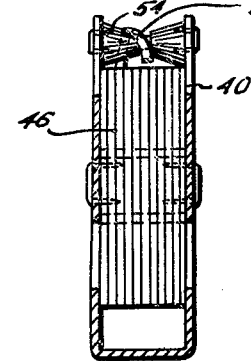

United States Patent Office 3,206,350
Patented Sept. 14, 1965

3,206,350
APPARATUS FOR APPLYING BINDING MATERIAL
Joseph R. Paradis, Wayland, and Louis E. Dillenbeck, Waltham, Mass., assignors to Paradis Products Company, Inc., Waltham, Mass., a corporation of Massachusetts
Filed Oct. 26, 1962, Ser. No. 233,255
9 Claims. (Cl. 156—527)

This invention relates to a method and device for applying binding materials, including tape, cord, string, and the like and more particularly, the invention is directed to a method of stringing wherein a binding material is continuously attached to a series of spaced-apart objects such as, for example, an arrangement of parallelly disposed wires, rods, or various other elongated bodies supported in spaced-apart or extended positions.

In one specific aspect, the invention is concerned with a method and device for attaching or stringing a series of parallelly arranged wires for the purpose of forming a plant supporting network such as is now employed in plant growing benches in greenhouses and similar planting localities.

It is customary at the present time in forming plant supporting networks of the character indicated, to arrange a plurality of horizontal wires or other elongated members in a parallelly spaced-apart position above the plant bench, and each time a network is to be formed, the operator resorts to a hand tying operation commonly referred to as "stringing," in which lengths of binding material such as string, cord, or tape are located crosswise of the wires with a separate knot or tie being made at each point of crossover. This is a time consuming and tiresome operation and adds to the work and expense in utilizing the plant supporting benches.

It is a chief object of the invention to provide an improved method and apparatus for rapidly and conveniently applying binding materials such as tape, string, cord and the like, and to devise a method and apparatus for mechanically engaging lengths of binding material to plant bench wire so as to eliminate the need for hand tying operations commonly employed in forming plant supporting networks.

Another object is to provide an improved form of plant supporting network in which a plurality of binding elements are combined with plant bench supporting wires in a novel manner.

A further object of the invention is to devise a unique tape stringing means for applying two or more adhesive-bearing tapes furnished from spools or cartridges supported in cooperating relationship to one another.

Still another object of the invention is to provide a novel tape containing cartridge which may be utilized either with or separately of tape stringing mechanism.

The nature of the invention and its other objects and novel features will be more fully understood and appreciated from the following description of preferred embodiments of the invention selected for purposes of illustration and shown in the accompanying drawings, in which:

FIGURE 4 is a cross sectional view taken centrally through the tape applying means shown in FIGURES 1 and 2;

FIGURE 5 is an elevational view showing the tape applying means with upper and lower sections thereof indicated in a partly opened position with respect to one another;

FIGURE 6 is a detail plan view of guide means in one of the sections;

FIGURE 7 is a cross section taken on the line 7—7 of FIGURE 4;

FIGURE 8 is a fragmentary elevational view showing a portion of the rear side of the tape applying means;

FIGURE 9 is a bottom plan view of a top section more clearly illustrating tape cutter means;

FIGURE 10 is a perspective view of a filler cartridge containing tape for use in the tape applying member shown in FIGURES 7 to 9 inclusive; and FIGURE 11 is a detail cross sectional view of a spool of tape as used in the filler cartridge of FIGURE 10.

The foregoing objectives may, we find, be realized in one preferred form of the invention by a method of mechanically applying two separate lengths of binder material at two opposite sides of a series of spaced-apart elongated members such as is exemplified by plant bench supporting wires or cords commonly used in greenhouses and similar areas.

In this preferred form of the method of the invention, we employ as one suitable type of binder material, adhesively coated plastic tape, although various other binder materials may be utilized. The binder material or tape is conveniently supported in roll form in a special tape applying or tape stringing device which is designed to be held by an operator and moved along a horizontal path of travel across a series of plant bench supporting wires. The tape stringing device is so designed that the plant bench wires may be passed through a medially located aperture therein and at the end of each transversing movement the binder tape is quickly cut off to leave the device in readiness for the next succeeding pass across the wires.

Figure 1:
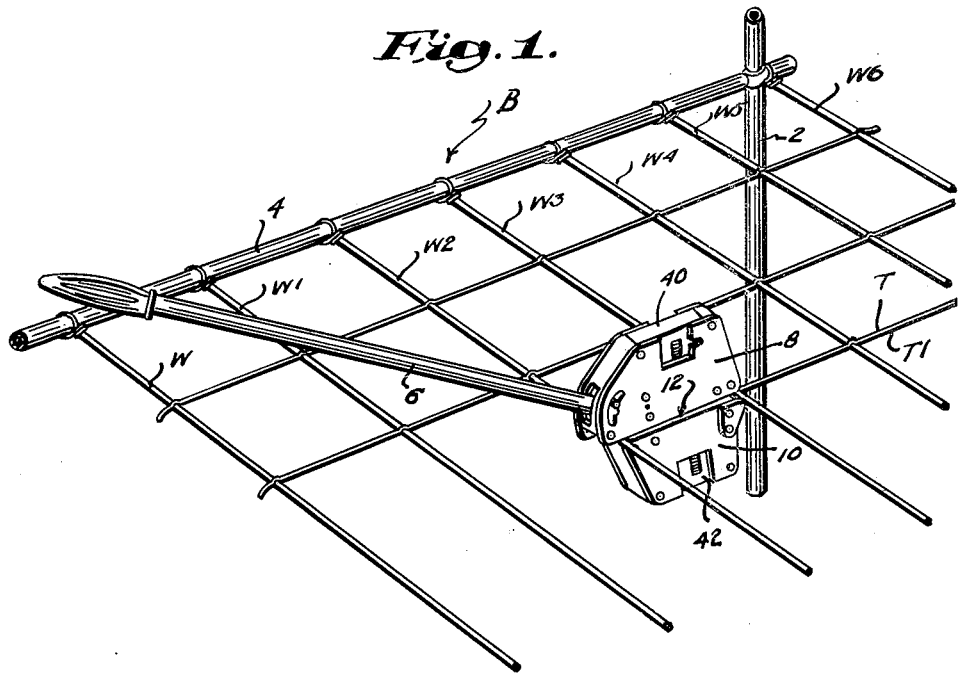
FIGURE 1 is a fragmentary perspective view illustrating a portion of a plant supporting network constructed in accordance with the invention.

Considering in greater detail the structure and operation of the stringing device of the invention, attention is first directed to FIGURE 1 wherein there is illustrated fragmentarily a portion of a plant bench generally indicated by the arrow B and consisting of a plurality of tubular uprights 2 having horizontal frame ends as 4 The uprights 2 are designed to support a series of wires or other type of elongated elements at some desired level above a plant bench which is not shown in the drawings, and which may consist, for example, of a body of plant-growing soil occurring either at ground level or in some sort of soil receptacle. As shown in FIGURE 1, the series of elongated elements comprises wires W, W1, W2, W3, W4, W5, W6, supported in an extended position between the member 4 and a similar member at the opposite end of the plant bench.

Figure 2:
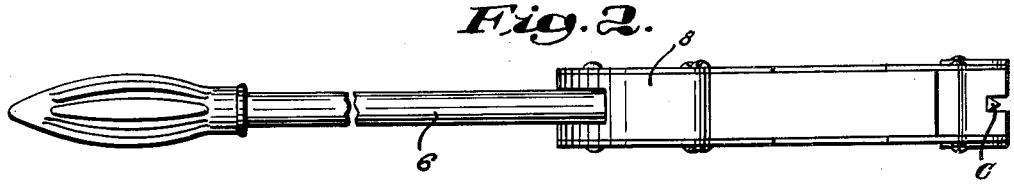
FIGURE 2 is a plan view of the tape applying means shown in FIGURE 1.

In accordance with the invention, we provide a device for applying successive lengths of binder tape crosswise of these elongated wires W, W1, W2, W3, W4, W5, W6, to form a plant supporting network. As shown in FIGURES 1 and 2, the tape applying or tape stringing device comprises in general a casing body made up of a handle 6 which is adjustably attached to an upper casing section 8 and a lower casing section 10. Casing section 10 is normally supported in slightly spaced relation to casing 8 to define a medial aperture 12 which is designed to receive therethrough the plant bench wires as suggested in FIGURE 1.

The two casing sections are maintained in connected relationship to one another by rotary locking means including lock wheels 14 and 16 rotatably mounted on shafts 13 and 15 between the sides of casing section 10 and cooperating lock wheel channel pieces 18, 18' and 20, 20' which are fixed at inner surfaces of casing section 8 as suggested in FIGURES 4, 5 and 7. The shaft 15 includes a spring-held plunger 15' which projects through the wall of casing 10 and which can be compressed to disengage the casing walls and allow for the cartridge unit to drop into a hinged apart position such as shown in FIGURE 5.

As illustrated in FIGURES 7 and 8, the lock wheels 14 and 16 are each formed with central slots as 14' and 16' and at their outer sides are recessed to form curved retaining edges as 22, 22', 24, 24'. These curved retaining edges are arranged to turn in curved channels 26, 26', 28, 28' in channel pieces 18, 18', 20, 20' as suggested in FIGURES 4 and 5. The outer peripheral portions of the lock wheels 14 and 16 are further formed with radially extending slots as 14a and 16a, which are equally spaced apart around the lock wheel circumferences to provide wire guideways adapted to move into register with the medial aperture 12 at periodic intervals. One such position of register is shown at the left hand side of FIGURE 4.

There are also provided flat spring elements 14b and 16b which are fixed in the casing section 10 in positions to engage against respective lock wheels 14 and 16 as indicated in FIGURES 4 and 7. These springs normally hold the lock wheels in stationary positions just in front of the medial aperture 12 so that a wire drawn through the medial aperture 12 may always engage in one of the slots. Thereafter, as the tape applying tool is drawn along, the engaging wire rotates the lock wheel 16 with the next slot being indexed into registered position with medial aperture 12.

After leaving the lock wheel 16 the wire, as described above, passes along the medial aperture 12 for a short distance. The wire is then again guided into a slot in lock wheel 14 where a similar indexing action takes place. At all times it will be noted that the lock wheel edges at some points are in engagement with the lock wheel channel pieces so that the two sections are always connected together while successive wire members are being passed therethrough.

Arranged in the casing sections 8 and 10 in cooperating relationship with the wire guiding aperture 12 and the lock wheels 14 and 16, are binder means consisting of two tape applying units. These tape applying units comprise two cartridge members 40 and 42 which contain respective rolls of tape 44 and 46. The tape is intended to be illustrative of any one of several forms of binding material such as string, cord, plastic filaments and the like, and in a preferred form may consist of a plastic strip bearing at one side thereof an adhesive coating of the permanently tacky type. Portions of tape from respective rolls 44 and 46 are indicated by reference characters T and T1 at the right hand side of FIGURE 4 and also in FIGURES 1 and 3.

The cartridge members 40 and 42 are slidably fitted into the respective casing sections and are detachably clipped in place by means of some suitable fastening means such as spring detents 50 and 52 as suggested in FIGURES 4 and 5 of the drawings. The arrangement of the cartridges, as will be observed from an inspection of FIGURE 4, is above and below the medial aperture 12. Tape portions drawn off from respective rolls may thus be supported in positions such that their tacky surfaces can be brought towards one another along paths of travel which converge and meet between the two lock wheels 14 and 16. To further guide the tape portions leaving the rolls 46 and 48, there are provided a series of guide rolls including rolls 54, 56, 58, 60, 62 and 64, which rolls are most clearly shown in FIGURES 4 and 6.

As indicated in FIGURE 6, roll 56 is of tapered shape and roll 54 is of a similar tapered shape. In particular these rolls 54 and 56 have conically converging surfaces which are specially constructed to receive tape as it comes from the rolls 46 and 48 and regardless of the angle of approach each tape portion is guided into a central guideway such as the guideway 56a shown in FIGURE 6. Similarly, the roll 60, as noted in FIGURE 6, is formed with a central guideway 60a in alignment with guideway 56a, and roll 64 is provided with a guideway 64a in similar alignment. By means of this arrangement the two tape portions coming from the rolls 40 and 42 are brought into contact with one another and positively guided into the central channel 14' of lock wheel 14. The rolls 54, 58 and 62, in the upper casing section, are similarly formed with central guideways so that the above-described action of the two tape portions can be carried out.

It is pointed out that the guide roll 64 extends above the casing section 10 into the medial aperture 12 as best noted in FIGURE 4, and at this point the casing section 8 is cut away to define curved edges as 8b. In addition, the roll 62 is mounted in the casing 8 in a manner such that it projects downwardly into a cut away section 10b of casing 10. Thus there is provided a sinuous or undulating passageway along which both the upper and lower tapes T and T1, as well as wire passing therethrough, must travel. This arrangement constitutes an important feature of the invention in that it provides for the two tapes being firmly pressed against one another in correct register along this sinuous path. In addition, the tapes are positively caused to adhere to one another at points very close to a wire element over which the tapes are crossed as suggested in FIGURE 3.

Considering this feature in greater detail in reference to a typical operation of stringing plant bench wires, the device with cartridges and rolls of tape loaded therein, is made ready by drawing off small portions of tape from each of the respective rolls. These small portions of tape are brought together around the guide rolls described above and in adhering relationship allowed to project out of the medial aperture 12 as suggested at the right hand side of FIGURE 4, and indicated by reference characters T and T1. The casing sections with the tape thus threaded through are moved from the position shown in FIGURE 5 into a fully closed position as shown in FIGURE 4 and the apparatus is then ready to use.

The operator grasps the handle 6 in one hand and stands at one side of the extended wires W, W1, W2, W3, W4, W5, W6, of a plant bench and while supporting the device in an extended position all the way across these plant bench wires, engages the first wire W6 in the medial aperture 12 and starts to draw the casing sections across the wires.

As the first wire W6 enters the medial aperture 12, it is immediately guided into a slot in lock wheel 16 and starts to turn this lock wheel through a predetermined arc of travel against the holding force of the spring 14b. At the end of this limited arc of travel the wire W6 is disengaged from its slot and the lock wheel is, at this time, indexed into a new position to which a succeeding slot has been positioned to register with the medial aperture 12. Wire W6, which is constantly moving through the medial aperture 12, moves toward lock wheel 14 where a similar indexing will occur, repeating the indexing movement described.

Figure 3:
FIGURE 3 is a detail view illustrating a series of wire elements with tape binding means applied thereto by the method of the invention.

As the wire W6 passes between the guide rolls 58 and 60, it begins to come into contact with the two tape portions T and T1 which instantly adhere to the wire. The wire and tape portions adhering at opposite sides thereof then move up over guide roll 64 and down around guide roll 62 along a sinuous path of travel which enables the tape portions T and T1 to be pressed firmly around the wire so that almost the entire surface of wire between the tape is overlapped and secured as indicated in FIGURE 3 and thus a desirable "tape stringing" or "tape tying" is achieved at the point of crossover.

Thereafter, the casing sections are drawn in quick succession from one to another of the wires W5, W4, W3, W2, W1 and W with the same tape stringing step occurring at each successive point of crossover. As the casing sections pass across the last wire in the series, namely, wire W, it will be observed that two tape portions adhering to one another are drawn out of the medial aperture 12 with the wire and at this point a cutting step is carried out. This cutting operation is quickly and efficiently accomplished by means of a cutter element C which consists of a V-shaped body having cutting edges arranged as best shown in FIGURES 8 and 9.

The arrangement of the cutter C is such that the operator, by slightly depressing the casing sections as they leave the last wire W, forces the tape portions against the cuting edges and they are instantly severed. The cut, it will be observed, leaves adhering tape portions threaded through the casing sections in readiness for the next pass of the apparatus across the wires at some desirable space such as has been suggested in FIGURE 1.

The method and apparatus disclosed has been described with specific reference to a plant bench stringing operation and it will be apparent that the time and labor required for hand tying at points of crossover is greatly reduced by the mechanical stringing of the invention. It should also be understood, however, that various other stringing operations may be carried out with the device disclosed where a simple tying operation is desired. Moreover, the parts described above may be modified in various respects. For example, we may employ other means of engaging the tape with the wire. We may also utilize magnet members releasably supported in the casing sections to hold these members together while still permitting a wire to be passed therebetween.

There may also be employed other forms of binding and tape guiding and tape applying elements within the scope of the invention. The cartridges 40 and 42 may also constitute tape applying means to be utilized independently of the casing sections. For example, the cartridge arrangement may be constructed with application roll means projecting slightly beyond the edges of the cartridge in a position such that the roll and tape may be pressed against a surface to which the tape is desired to be attached. This provides for a single tape application and permits some latitude in directing the line of tape application along curved or otherwise directed paths in some predetermined manner.

It may also be desired to utilize the rolls of tape independently of the cartridges in which the case the rolls of tape might be supported directly on spindles mounted in the casing sections.

While we have disclosed the above-noted preferred embodiments of the invention, it is intended that various other changes and modifications may be employed in keeping with the scope of the invention as defined by the appended claims.

We claim:

1. A device for applying binder material, including a casing consisting of upper and lower sections, rotary locking means for connecting the upper and lower sections in spaced relationship to define a binder applying guide-way, binding material releasably supported in the casing and means for applying the binding material to an object passing through the said rotary locking means and the tape applying guide-way.

2. A structure as defined in claim 1 in which the casing includes an elongated handle.

3. A device for applying binding material, including a casing consisting of upper and lower sections, rotary locking means for supporting the upper and lower sections in spaced relationship to define an aperture formed medially therethrough and extending between two opposite sides, binding material cartridges releasably supported in the casing and rolls of binding material mounted in the cartridges for engaging with an object passing through the said aperture and said rotary locking means.

4. A device for applying binding material, including a casing comprising two separated sections, rotary locking means for connecting the sections in spaced relationship to define an aperture which extends medially between the two sections, binding material releasably supported in the casing, means for engaging the binding material with an object passing through the said aperture, and cutter means arranged in the casing at one side of the aperture and the rotary locking means.

5. A structure as defined in claim 4 in which the means for engaging the binding material comprises a plurality of press rolls arranged in the casing at opposite sides of the said aperture.

6. A device for stringing binding material comprising a casing consisting of upper and lower sections, rotary locking means for connecting the upper and lower sections in spaced relationship to define a binder applying guide-way, binding material cartridges releasably supported in the casing, separate lengths of binding material mounted in roll form in the cartridges, guide roll means in the cartridges for guiding portions of binding material from respective rolls of binding material into extended positions at opposite sides of the aperture press roll members rotatably supported in the casing at either side of aperture for periodically engaging said portions of extended binding material, and cutter means arranged externally of the casing at one edge thereof in a position to cut the binding materials when forced into contact therewith.

7. An apparatus for stringing together plant bench supporting wires, said apparatus comprising a casing having an upper section and a lower section hinged thereto, said sections normally occurring in spaced-apart relationship to define a medial guide-way through which plant bench wires may be passed, binding means releasably supported in the casing, locking means for securing the lower section to the upper section of the casing, said locking means including rotatable members presenting slotted peripheral edges arranged to move into register with the said guide-way and cooperate therewith in guiding plant bench wire elements between the said sections and means for applying the said binding material to the plant bench wires when passed between the said sections of the casing, and said means consisting of press rolls rotatably supported in the casing at upper and lower sides of the guide-way.

8. A structure according to claim 7 in which the binding means consists of upper and lower cartridges of rolled binding material supported in respective upper and lower sections of the casing at opposite sides of the said guide-way.

9. A structure as defined in claim 7 in which the locking means further includes hangar elements fixed in the casing and presenting arcuate slots for receiving curved edges of the rotatable members.

References Cited by the Examiner

UNITED STATES PATENTS

| 949,239 | 2/10 | Lozier | 47—45 |
|---|---|---|---|
| 2,086,451 | 7/37 | Vetter | 47—45 |
| 2,427,229 | 9/47 | Riley | 156—290 |
| 2,514,453 | 7/50 | Miller | 156—522 |
| 2,536,455 | 1/51 | Miller et al. | 156—522 |
| 2,603,376 | 7/52 | Miller et al. | 156—522 |
| 2,872,061 | 2/59 | Tostado | 156—522 |
| 2,899,347 | 8/59 | Kindseth | 156—290 |
| 2,939,600 | 6/60 | Briggs | 156—522 |
| 3,092,534 | 6/63 | Ward | 156—523 |

EARL M. BERGERT, *Primary Examiner.*

DOUGLAS J. DRUMMOND, *Examiner.*